Figure 1:
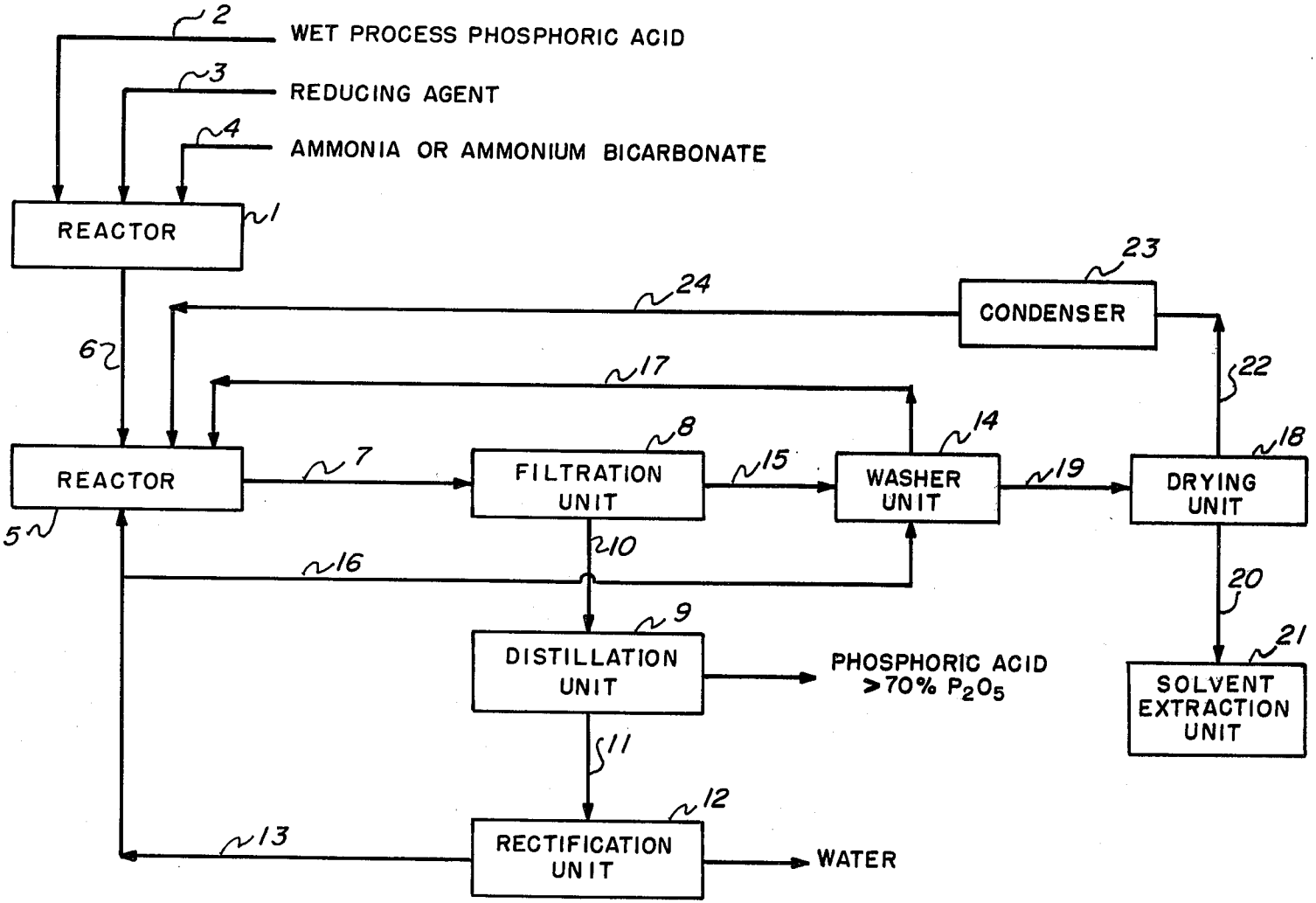
Figure 2:
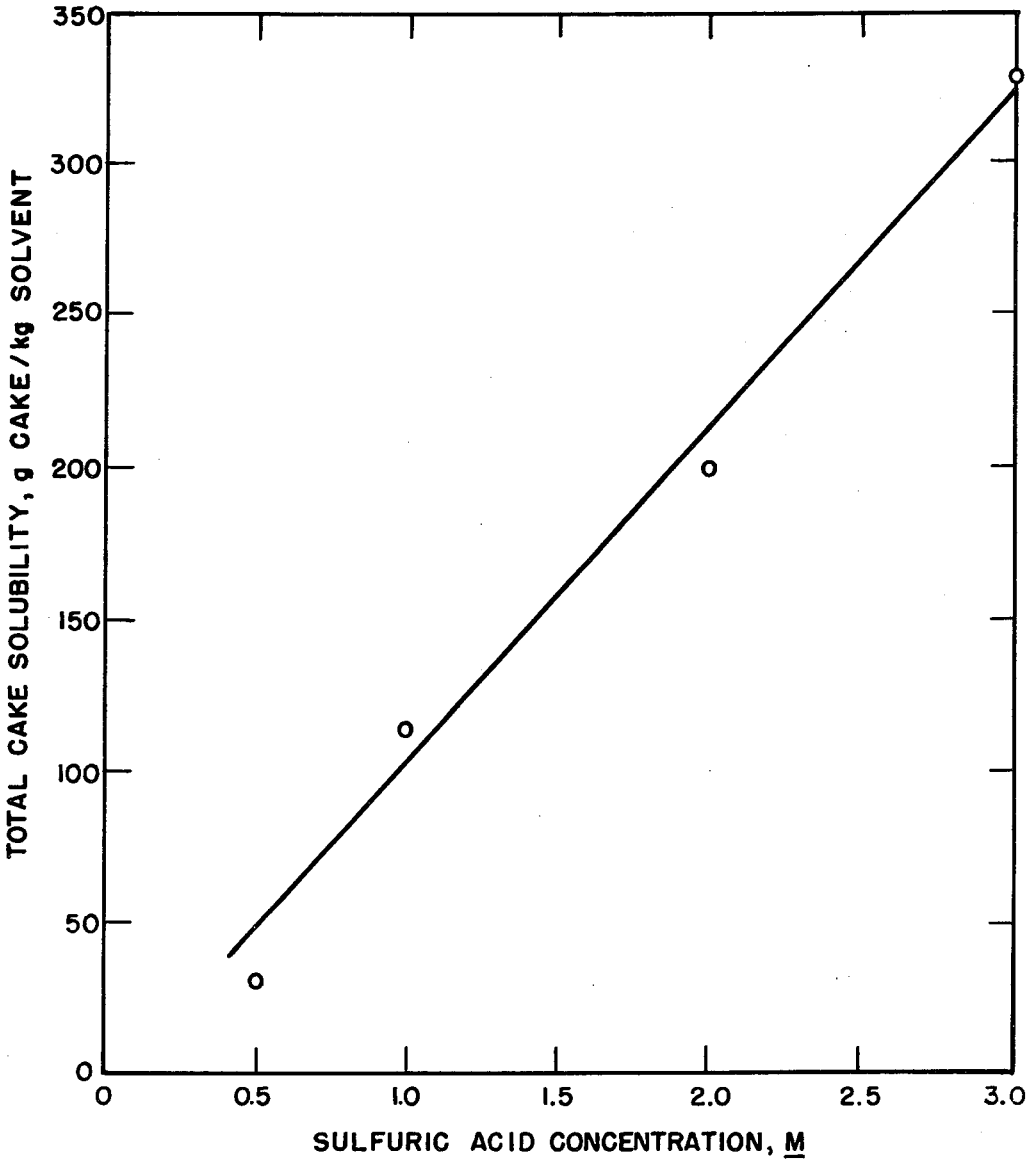

United States Defensive Publication [19] (H) [11] T970,007

McCullough et al. [43] May 2, 1978

[54] URANIUM RECOVERY FROM WET-PROCESS PHOSPHORIC ACID

[75] Inventors: John F. McCullough; John F. Phillips, Jr.; Leslie R. Tate, all of Florence, Ala.

[73] Assignee: Tennessee Valley Authority

[21] Appl. No.: 781,216

[22] Filed: Mar. 25, 1977

[51] Int. Cl.[2] ..... C01G 43/00

[52] U.S. Cl. ..... 423/10; 423/11; 423/18

[57] ABSTRACT

A method of recovering uranium from wet-process phosphoric acid wherein the acid is treated with a mixture of an ammonium salt or ammonia, a metallic reducing agent such as iron, aluminum or zinc, and then a miscible solvent such as methanol. The precipitated solids, which are separated from the purified phosphoric acid, consist of a mixture of metal phosphates and uranium. This solid is dissolved in acid and the uranium recovered from the solution by liquid-liquid solvent extraction. The miscible solvent and some water are distilled away from the purified phosphoric acid. The distillate is rectified, the water discarded, and the miscible solvent recovered for recycle.

When the miscible solvent is methanol, the optimum ranges of ammonia and methanol are 0.05 to 0.20 gram atom nitrogen per gram atom phosphorus and 1.93 to 3.15 pounds methanol per pound of orthophosphoric acid. The amount of reducing agent added should be sufficient to reduce all uraniun to U(IV). Under these conditions, >99 percent of the uranium is precipitated from the wet-process acid. About 90 percent of the phosphorus in the acid is recovered as purified phosphoric acid.

3 Claims, 2 Sheets Drawing,

19 Pages Specification

The file of this unexamined application may be inspected and copies thereof may be purchased (849 O.G. 1221, Apr. 9, 1968).

PRECIPITATION OF URANIUM CONCENTRATE FROM WET PROCESS PHOSPHORIC ACID WITH RECOVERY OF CONCENTRATED PHOSPHORIC ACID

EFFECT OF SULFURIC ACID CONCENTRATION ON METHANOL PRECIPITATED CAKE DISSOLUTION